Aug. 2, 1932.                H. H. GLASIER                1,869,961
                         POWER DRIVEN SPADER
                         Filed Aug. 31, 1931      2 Sheets-Sheet 1

INVENTOR
Harold H. Glasier
BY
Westall and Wallace
ATTORNEYS

Aug. 2, 1932.  H. H. GLASIER  1,869,961
POWER DRIVEN SPADER
Filed Aug. 31, 1931  2 Sheets-Sheet 2

INVENTOR
*Harold H. Glasier*
BY *Westall and Wallace*
ATTORNEYS

Patented Aug. 2, 1932

1,869,961

UNITED STATES PATENT OFFICE

HAROLD H. GLASIER, OF LOS ANGELES, CALIFORNIA

POWER DRIVEN SPADER

Application filed August 31, 1931. Serial No. 560,343.

This invention relates to a spader for breaking out, turning and breaking up the soil. It pertains to a digging machine having oscillating spades.

The invention contemplates a wheeled digger having a ground wheel from which the spades are operated. It is an object of the invention to provide a digger of the character described having tractor wheels to incise the ground and oscillating spades following the tractor wheels. It is another object of this invention to provide a digger having a set of primary spades to break out the soil and a set of secondary spades to turn the broken out soil and break up the clods. A further object of this invention is to provide a set of secondary spades having a greater amplitude of movement and a greater linear speed than the primary spades. A still further object of this invention is to provide a ground wheel serving as a motor propelled tractor wheel and oscillating spades operated by the motor. In addition to the broader objects of this invention, there are details of mechanical structure whereby the spades and ground wheels are geared together.

These objects together with other objects and corresponding accomplishments are obtained by means of the embodiment of my invention illustrated in the accompanying drawings, in which:—

Figure 1:
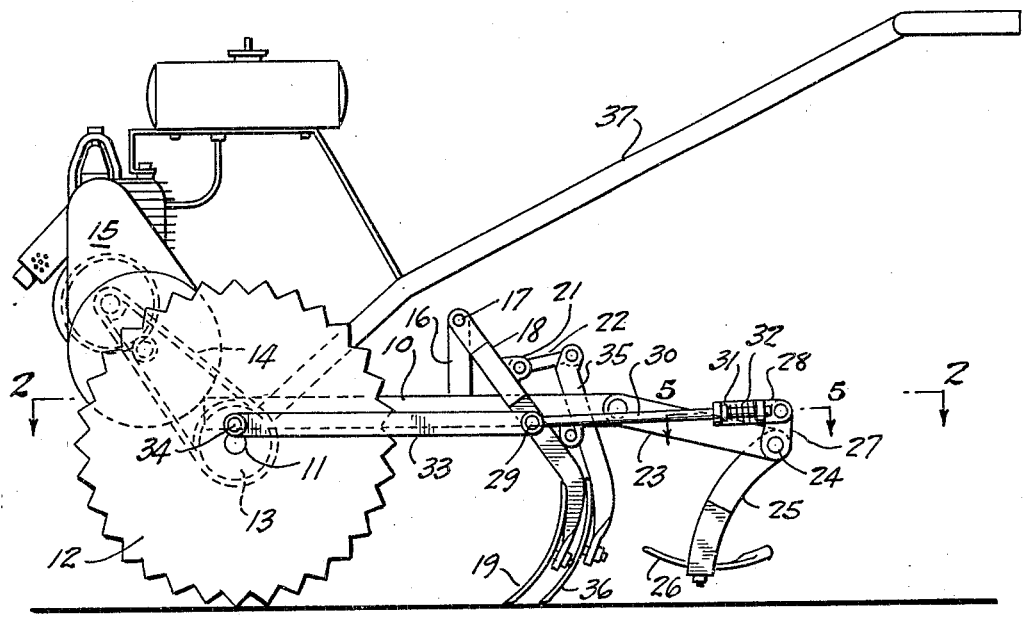
Figure 2:
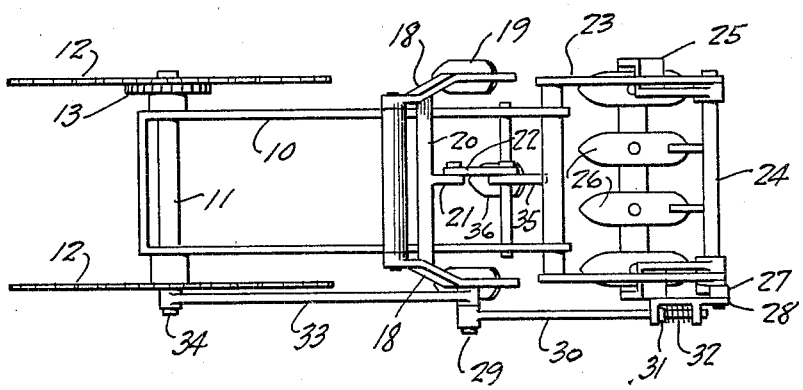
Figure 3:
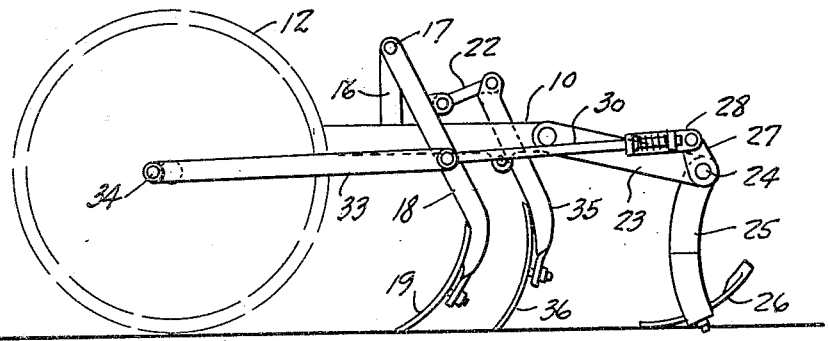
Figure 4:
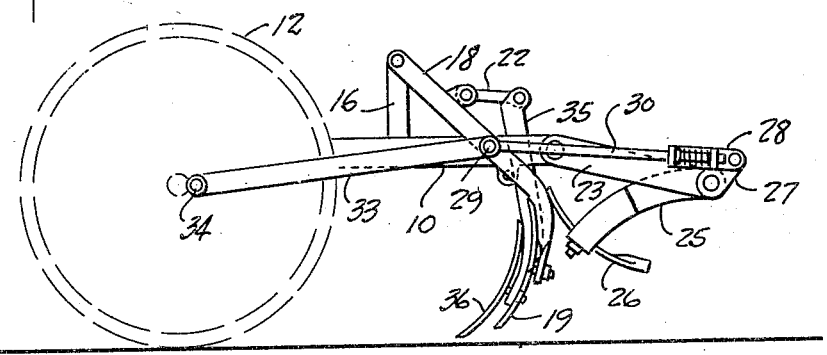
Figure 5:
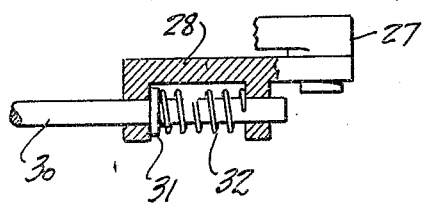

Fig. 1 is a side elevation of a complete spader; Fig. 2 is a plan view as seen in section on the line 2—2 of Fig. 1; Fig. 3 is a diagrammatic side elevation showing the spades in one digging position; Fig. 4 is a view similar to Fig. 3 showing another position of the spades; and Fig. 5 is a section as seen on the line 5—5 in Fig. 1.

A suitable frame 10 has a shaft 11 spanning the front and journalled on the frame in bearing blocks. Ground or tractor wheels 12 are secured to the ends of shaft 11 and overhang the frame. Fixed to the shaft 11 is a sprocket wheel 13 over which passes a sprocket chain 14 driven by a power plant indicated generally by 15. This power plant may be a gas engine with suitable accessories. The particular structure is not pertinent to the present invention and is conventionally shown. The tractor wheels 12 are preferably of disk form with serrated rims. Such tractor wheels cut or incise the ground as well as obtain firm tractive grip.

Upstanding from the side bars of the frame are standards 16 spanned by a shaft having the primary spades fixed to its ends. The shaft 17 is pivotally mounted in standards 16. The primary spades have shanks 18 with scoops 19 secured to their lower ends. The arrangement is such that the primary spades may be oscillated and the spades are levers of the third class. A cross bar 20 is fixed to shanks 18 and has an ear 21 to which a coupling link 22 is pivotally secured. At the rear of the frame 10 is an auxiliary frame 23 which is fixed to the cross bars of frame 10. A shaft 24 extends across the auxiliary frame and is pivotally mounted thereon. Fixed to the shaft 24 is a yoke 25 having spades 26 inclining forwardly with respect to the yoke arms, the latter being in effect shanks. Secured to the shaft 24 is a crank arm 27 so that the secondary spades constitute levers of the first class.

A resilient connection between the crank arm 27 and a connecting bar is provided by a connector 28 pivotally secured to the crank arm 27 and having spaced ears with alined holes. On one of the shanks 18 is a pin 29. Pivotally mounted on the pin is a connecting bar 30 which slidably extends through the ears on connector 28. A collar 31 is mounted upon the connecting bar and a compression spring 32 is seated on the collar and abuts the rear ear. Thus, a resilient connection is provided between the secondary spades and the connecting bar. Pivotally mounted upon the pin 29 is a connecting rod 33 whose forward end is rotatably mounted upon a crank pin 34 extending from a tractor wheel 12. The connecting rod 33 and connecting bar 30 constitute a connecting link between the tractor wheel 12 and the primary and secondary sets of spades. The connecting link changes rotary motion of the wheels 12 into reciprocating motion.

A third spade is pivotally mounted on the frame adjacent the primary set of spades and has a shank 35 to which a scoop is secured. The coupling link 22 is pivotally secured to the upper end of shank 35, the latter being pivotally mounted upon the frame. The arrangement is such that the primary spades and the third spade swing in opposite directions. It is also obvious that the primary and secondary spades swing in opposite directions. However, due to the crank arm 27 being shorter than the crank arm on the primary spades between shaft 17 and pin 29, the amplitude of movement of the secondary spades will be greater. It follows that the linear speed of movement of the scoops 26 is greater than the linear speed of scoops 19. For guiding the implement, handles 37 are provided. These handles may be of any suitable construction and carry control means for the gas engine such as a throttle, not shown.

In the operation of the device, assuming the parts are in a position shown in Fig. 1, rotation of the ground wheels to carry the spader forward will cause the secondary spades to be swung toward the rear as shown in Fig. 3. At the same time the primary spades will be forced downwardly into the ground and forward. The primary spades break out the soil which has been incised in advance by the tractor wheels 12. In the position shown in Fig. 3 the scoops 26 of the secondary spades strike the ground in their backward movement and tend to advance the tractor, counteracting the forward tendency of the primary spades. Continued movement of the wheels 12 causes the primary spades to be swung toward the rear and lifted from the ground while the secondary spades swing forwardly. Immediately after the primary spades have broken out the ground, the secondary spades engage the clods raising the latter rapidly and effecting a turnover. On the backward movement of the secondary spades the soil is struck by the backs of the secondary scoops and further broken up. The third spade by reason of its alternate swinging movement with respect to the primary spades aids in the breaking out action as well as counteracting the tendency of the primary spades to intermittently retard advance of the implement. There is a combined incising, breaking out, breaking up and turning over of the soil effected by the digger.

What I claim is:—

1. A spader comprising a frame, a ground wheel at the forward end of said frame; a set of primary spades pivotally mounted on said frame intermediate the front and rear thereof; a set of secondary spades pivotally mounted on said frame at the rear of said primary spades; means connected to said wheel to change rotary motion to reciprocating motion, said means including a reciprocating link connected to the arms of the primary set of spades and secondary set of spades on opposite sides of the pivotal axes of said sets whereby the primary and secondary sets of spades oscillate in opposite directions.

2. A spader comprising a frame, a ground wheel at the forward end of said frame; a set of primary spades pivotally mounted on said frame intermediate the front and rear thereof; a set of secondary spades pivotally mounted on said frame at the rear of said primary spades; means connected to said wheel to change rotary motion to reciprocating motion, said means including a reciprocating link connected to the arms of the primary set of spades and secondary set of spades on opposite sides of the pivotal axes of said sets, the crank arms of the secondary set of spades being shorter than the crank arms of the primary set of spades whereby the sets of spades oscillate in opposite directions and the secondary set swing through a greater amplitude than said primary set.

3. A spader comprising a frame, a ground wheel of disk form at the forward end of said frame; a set of primary spades pivotally mounted on said frame intermediate the front and rear thereof; a set of secondary spades pivotally mounted on said frame at the rear of said primary spades; a crank pin on said wheel, a connecting rod secured on said pin to change rotary motion to reciprocating motion, said connecting rod being connected to the arms of the primary set of spades, a connecting bar secured to said rod and to the secondary set of spades to form with said rod a reciprocating link, the rod being secured to the primary set of spades on the sides of their pivotal arms opposite to the connection of said bar to said secondary set of spades whereby the primary and secondary sets of spades oscillate in opposite directions.

4. A spader comprising a frame, a ground wheel of disk form at the forward end of said frame; a set of primary spades pivotally mounted on said frame intermediate the front and rear thereof; a set of secondary spades pivotally mounted on said frame at the rear of said primary spades; a crank pin on said wheel, a connecting rod secured on said pin to change rotary motion to reciprocating motion, said connecting rod being connected to the arms of the primary set of spades, a connecting bar secured to said rod and to the secondary set of spades, to form with said rod a reciprocating link, the rod being secured to the primary set of spades or the sides of their pivotal axes opposite to the connection of said bar to said secondary set of spades, the crank arms of said secondary set of spades being shorter than the crank arms of said primary set of spades whereby the primary and secondary sets of spades oscillate in opposite directions and the secondary set swing through a greater amplitude than said primary set.

5. A spader comprising a frame, a ground wheel at the forward end of said frame; a set of primary spades pivotally mounted on said frame intermediate the front and rear thereof; a set of secondary spades pivotally mounted on said frame at the rear of said primary spades; means connected to a wheel to change rotary motion to reciprocating motion, said means including a reciprocating link connected to the arms of the primary spades to constitute a lever of the third class and being connected to said secondary spades to constitute a lever of the first class whereby the primary and secondary sets of spades oscillate in opposite directions.

6. A spader comprising a frame, a ground wheel at the forward end of said frame; a set of primary spades pivotally mounted on said frame intermediate the front and rear thereof; a set of secondary spades pivotally mounted on said frame at the rear of said primary spades; means connected to said wheel to change rotary motion to reciprocating motion, said means having a reciprocating link connected to the arms of the primary set of spades and including a resiliently expansible connection to the arms of said secondary set of spades, the connections being on opposite sides of the pivotal axes of said sets whereby the primary and secondary sets of spades oscillate in opposite directions.

7. A spader comprising a frame, a ground wheel at the forward end of said frame; a set of primary spades pivotally mounted on said frame intermediate the front and rear thereof; a set of secondary spades pivotally mounted on said frame at the rear of said primary spades; means connected to said wheel to change rotary motion to reciprocating motion, said means having a reciprocating link connected to the arms of the primary set of spades and including a resiliently expansible connection to the arms of said secondary set of spades, the connections being on opposite sides of the pivotal axes of said sets, the crank arms of the secondary set of spades being shorter than the crank arms of the primary set of spades whereby the sets of spades oscillate in opposite directions and the secondary set swing through a greater amplitude than said primary set.

8. A spader comprising a frame, a serrated tractor wheel of disk form at the forward end of said frame; a set of primary spades pivotally mounted on said frame intermediate the front and rear thereof; a set of secondary spades pivotally mounted on said frame at the rear of said primary spades; a crank pin on said wheel, a connecting rod secured on said pin to change rotary motion to reciprocating motion, said connecting rod being connected to the arms of the primary set of spades, a connecting bar secured to said rod and having a resiliently expansible connection to the secondary set of spades to form with said rod a reciprocating link, the rod being secured to the primary set of spades on the sides of their pivotal arms opposite to the connection of said bar to said secondary set of spades whereby the primary and secondary sets of spades oscillate in opposite directions.

9. A spader comprising a frame, a serrated tractor wheel of disk form at the forward end of said frame; a set of primary spades pivotally mounted on said frame intermediate the front and rear thereof; a set of secondary spades pivotally mounted on said frame at the rear of said primary spades; a crank pin on said wheel, a connecting rod secured on said pin to change rotary motion to reciprocating motion, said connecting rod being connected to the arms of the primary set of spades, a connecting bar secured to said rod and having a resiliently expansible connection to the secondary set of spades, to form with said rod a reciprocating link, the rod being secured to the primary set of spades or the sides of their pivotal axes opposite to the connection of said bar to said secondary set of spades, the crank arms of said secondary set of spades being shorter than the crank arms of said primary set of spades whereby the primary and secondary sets of spades oscillate in opposite directions and the secondary set swing through a greater amplitude than said primary set.

10. A spader comprising a frame, a serrated tractor wheel at the forward end of said frame; a set of primary spades pivotally mounted on said frame intermediate the front and rear thereof; a set of secondary spades pivotally mounted on said frame at the rear of said primary spades; means connected to a wheel to change rotary motion to reciprocating motion, said means having a reciprocating link connected to the arms of the primary spades to constitute a lever of the third class and including a resiliently expansible connection to said spades to constitute a lever of the first class whereby the primary and secondary sets of spades oscillate in opposite directions.

11. A spader comprising a frame, a ground wheel at the forward end of said frame; a set of primary spades pivotally mounted on said frame intermediate the front and rear thereof; a set of secondary spades pivotally mounted on said frame at the rear of said primary spades; means connected to a wheel to change rotary motion to reciprocating motion, said means having a reciprocating link connected to the arms of the primary spades to constitute a lever of the third class and being connected to said secondary spades to constitute a lever of the first class whereby the primary and secondary sets of spades oscillate in opposite directions, a third spade pivotally mounted on said frame adjacent said primary set to constitute a lever of the third class and a connecting coupling securing said third space to said primary set whereby to swing said third spade opposite to said primary set.

12. A spader comprising a frame, a ground wheel at the forward end of said frame; a set of primary spades pivotally mounted on said frame intermediate the front and rear thereof; a set of secondary spades pivotally mounted on said frame at the rear of said primary spades; means connected to a wheel to change rotary motion to reciprocating motion, said means having a reciprocating link connected to the arms of the primary spades to constitute a lever of the third class and being connected to said secondary spades to constitute a lever of the first class, the crank arms of said secondary set being shorter than the crank arms of said primary set whereby the primary and secondary sets of spades oscillate in opposite directions and said secondary set swing through a greater amplitude than said primary set; a third spade pivotally mounted on said frame adjacent said primary set to constitute a lever of the third class and a connecting coupling securing said third spade to said primary set whereby to swing said third spade opposite to said primary set.

13. A spader comprising a frame, a ground wheel at the forward end of said frame; a set of primary spades pivotally mounted on said frame intermediate the front and rear thereof; a set of secondary spades pivotally mounted on said frame at the rear of said primary spades; means connected to a wheel to change rotary motion to reciprocating motion, said means having a reciprocating link connected to the arms of the primary spades to constitute a lever of the third class and being connected to said secondary spades to constitute a lever of the first class whereby the primary and secondary sets of spades oscillate in opposite directions, the scoops of the secondary set of spades being inclined forwardly to their shanks to raise the soil; a third spade pivotally mounted on said frame adjacent said primary set to constitute a lever of the third class and a connecting coupling securing said third spade to said primary set whereby to swing said third spade opposite to said primary set.

14. A spader comprising a frame, a ground wheel at the forward end of said frame; a set of primary spades pivotally mounted on said frame intermediate the front and rear thereof; a set of secondary spades pivotally mounted on said frame at the rear of said primary spades; means connected to a wheel to change rotary motion to reciprocating motion, said means having a reciprocating link connected to the arms of the primary spades to constitute a lever of the third class and being connected to said secondary spades to constitute a lever of the first class whereby the primary and secondary sets of spades oscillate in opposite directions, the scoops of the secondary set of spades being inclined forwardly to their shanks to raise the soil.

15. A power driven spader comprising a frame, a motor on said frame, a tractor wheel at the forward end of said frame driven by said motor; a set of spades pivotally mounted on said frame at the rear of said wheel; and reciprocating means operated by said motor including a reciprocating link connected to the arms of the set of spades, whereby said set of spades oscillate with advance of said spader.

16. A power spader comprising a frame, a motor on said frame, a serrated tractor wheel at the forward end of said frame driven by said motor; a set of spades pivotally mounted on said frame at the rear thereof; and reciprocating means connected to said wheel and operated thereby, said means including a reciprocating link connected to the arms of said set of spades whereby said set of spades oscillate with advance of said spader.

17. A power driven spader comprising a frame, a motor on said frame, a tractor wheel at the forward end of said frame driven by said motor, a set of primary spades pivotally mounted on said frame intermediate the front and rear thereof; a set of secondary spades pivotally mounted on said frame at the rear of said primary spades; a reciprocating link driven by said motor, said link being connected to the arms of the primary and secondary sets of spades, the rod link being secured to the primary set of spades on the sides of their pivotal arms opposite to the connection of said link to said secondary set of spades whereby the primary and secondary sets of spades oscillate in opposite directions.

18. A power driven spader comprising a frame, a motor on said frame, a tractor wheel at the forward end of said frame driven by said motor; a set of primary spades pivotally mounted on said frame intermediate the front and rear thereof; a set of secondary spades pivotally mounted on said frame at the rear of said primary spades; a connecting rod reciprocally operated by said motor, said connecting rod being connected to the arms of the primary set of spades, a connecting bar secured to said rod and to the secondary set of spades, to form with said rod a reciprocating link, the rod being secured to the primary set of spades or the sides of their pivotal axes opposite to the connection of said bar to said secondary set of spades, whereby the primary and secondary sets of spades oscillate in opposite directions.

19. A power driven spader comprising a frame, a motor on said frame, a tractor wheel at the forward end of said frame driven by said motor; a set of primary spades pivotally mounted on said frame intermediate the front and rear thereof; a set of secondary spades pivotally mounted on said frame at the rear of said primary spades; a connecting rod reciprocably operated by said motor, said connecting rod being connected to the arms of the primary set of spades, a connecting bar secured to said rod and having a connection to the secondary set of spades to form with said rod a reciprocating link, the rod being secured to the primary set of spades on the sides of their pivotal axes opposite to the connection of said bar to said secondary set of spades, the crank arms of said secondary set of spades being shorter than the crank arms of said primary set of spades whereby the primary and secondary sets of spades oscillate in opposite directions and the secondary set swing through a greater amplitude than said primary set.

In witness that I claim the foregoing I have hereunto subscribed my name this 25th day of August, 1931.

HAROLD H. GLASIER.